United States Patent [19]

Swart et al.

[11] 4,105,633

[45] Aug. 8, 1978

[54] ALTERNATING COPOLYESTERCARBONATE RESINS

[75] Inventors: Daniel J. Swart; Jacqueline S. Kelyman, both of Midland, Mich.

[73] Assignee: The Dow Chemical Company, Midland, Mich.

[21] Appl. No.: 795,978

[22] Filed: May 11, 1977

[51] Int. Cl.$^2$ ............................................. C08G 63/62
[52] U.S. Cl. .................................... 528/176; 260/463
[58] Field of Search ............ 260/47 XA, 77.5 D, 463, 260/860

[56] References Cited

U.S. PATENT DOCUMENTS

| | | | |
|---|---|---|---|
| 3,030,331 | 4/1962 | Goldberg | 260/47 XA |
| 3,169,121 | 2/1965 | Goldberg | 260/47 |

*Primary Examiner*—Theodore E. Pertilla

[57] ABSTRACT

Alternating copolyestercarbonate resins having repeating units of the formula:

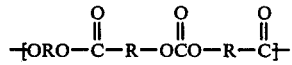

wherein each R is independently an aromatic hydrocarbylene or inertly substituted aromatic hydrocarbylene, e.g.,

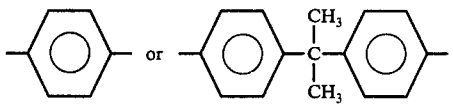

exhibit physical properties such as heat and impact resistance that are superior to the heat and impact resistance of corresponding random copolymers. Such resins are useful for making transparent tough films and molded articles having high heat resistance.

10 Claims, No Drawings

ALTERNATING COPOLYESTERCARBONATE RESINS

BACKGROUND OF THE INVENTION

This invention relates to linear copolyesters that contain both carbonate groups and carboxylate groups in a linear chain.

Polycarbonate resins are known to be tough and rigid and have moderately high softening temperatures. Of particular interest are the polycarbonates of bisphenol-A diols as described in U.S. Pat. No. 3,028,365. On the other hand, polyesters such as those derived from terephthalic acid and/or isophthalic acid are well known as molding resins having high softening temperatures but poor impact resistances.

In the past, it has been a practice to make random linear copolymers containing ester and carbonate linkages in order to obtain polymers having heat distortion temperatures generally higher than those characteristic of polycarbonates. See, for example, U.S. Pat. Nos. 3,169,121; 3,549,570; 3,053,810; 3,030,331; and 3,220,976. Unfortunately, however, the desired increase in heat distortion is often not as high as needed for many applications. More importantly, any increase in heat distortion is achieved only by sacrificing almost all of the high impact resistance that is characteristic of polycarbonate resins.

In view of the aforementioned deficiencies of conventional polyesters, polycarbonates and copolymers thereof, it would be highly desirable to provide a polymer of the same or similar monomeric materials wherein improved heat resistance is obtained without almost total sacrifice of impact resistance.

SUMMARY OF THE INVENTION

Accordingly, the present invention is such a polymer. This polymer is a normally solid alternating copolyestercarbonate consisting essentially of repeating units of the formula:

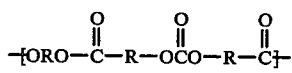

wherein each R is independently aromatic hydrocarbylene or inertly substituted aromatic hydrocarbylene. This alternating copolymer is advantageously prepared by reacting a dihydric phenol with a bis(ar-haloformylaryl) carbonate. The reaction is carried out as a two-phase reaction wherein one reactant in one phase is dispersed, advantageously with the aid of surfactant, into the other phase containing the other reactant. Advantageously, a quaternary salt is employed as an accelerator for the reaction. While the alternating copolymers of this invention are similar in many respects to their corresponding random copolymers, they exhibit heat resistance and impact resistance that are unexpectedly higher than those of the random copolymers.

The alternating copolymers of this invention, particularly the resinous ones, are useful in most applications in which polycarbonates, polyesters and copolymers thereof are conventionally employed. In particular, such alternating copolymers are useful for making transparent tough films and molded articles having high heat resistance.

DETAILED DESCRIPTION OF ILLUSTRATIVE EMBODIMENTS

The dihydric phenols used in preparing the alternating copolymers of the present invention are suitably any aromatic compound having an aromatic hydrocarbylene group to which is aromatically bonded two hydroxyl groups. Most advantageously, the dihydric phenols are those aromatic diols represented by the formula:

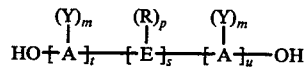

In the formula, A is an aromatic group such as phenylene, biphenylene, naphthenylene, anthracenylene and the like. E is alkylene or alkylidene such as methylene, ethylene, ethylidene, propylene, propylidene, isopropylidene, butylene, butylidene, isobutylidene, amylene, isoamylene, amylidene, and isoamylidene or E may be cycloalkylene such as cyclopentylene, cyclohexylene; a sulfur-containing linkage such as sulfide, sulfoxide or sulfone, an ether linkage; a carbonyl group; a tertiary nitrogen group, or a silicone-containing linkage such as silane or siloxy. R is hydrogen or a monovalent hydrocarbon group such as alkyl, aryl, arylalkyl, or cycloaliphatic; Y is chlorine, bromine, fluorine, or R wherein R is defined above. The letter $m$ is any whole number from and including zero through the number of positions on A available for substitution; $p$ is any whole number from and including zero through the number of available positions on E; $t$ is a whole number equal to at least one; $s$ is either zero or one; and $u$ is any whole number including zero. Examples of such dihydric phenols include 2,2-bis-(4-hydroxyphenyl)propane [bisphenol-A], 2,4'-dihydroxydiphenylmethane, bis-(2-hydroxyphenyl)methane, 1,1-bis-(4-hydroxyphenyl)ethane, and others including dihydroxy aromatic ethers listed in U.S. Pat. No. 3,169,121 at column 2, line 60–column 3, line 55.

Also included among the suitable dihydric phenols are those having an ar,ar'-dihydroxytrityl nucleus represented by the formula:

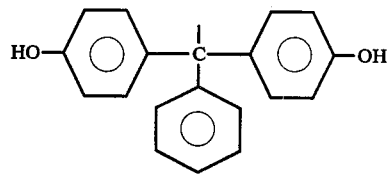

wherein the aromatic rings bear, in addition to the hydroxy substituents, such substituents as H, F, Cl, Br, I, —NO₂, —O—, alkyl, acyl, carboxylate ester, sulfonate ester and the like. Representative diols containing the ar,ar'-dihydroxytrityl nucleus include phenolphthalein nucleus compounds as described in U.S. Pat. No. 3,036,036; phenolsulfonephthalein nucleus compounds described in U.S. Pat. No. 3,036,037; phthalidene nucleus compounds as described in U.S. Pat. No. 3,036,038; fluorescein nucleus compounds as described in U.S. Pat. No. 3,036,039; and phenolphthalimidene nucleus compounds corresponding to the phenolphthalein nucleus compounds described in U.S. Pat. No. 3,036,036; all of which patents are hereby incorporated by reference. Of the aforementioned dihydric phenols, the bis(ar-hydroxyphenyl)alkylidenes, particularly bisphenol-A, and phenolphthalein are preferred, with bisphenol-A being most preferred.

While any bis(ar-haloformylaryl)carbonate is suitably employed in making the alternating copolymer, it is preferably one represented by the formula:

wherein each R is independently an aromatic hydrocarbylene including inertly substituted aromatic hydrocarbylene and X is halo, more preferably chloro or bromo, most preferably chloro. Exemplary aromatic hydrocarbylene include phenylene, biphenylene, naphthenylene, anthracenylene, alkylidenediphenylene such as isopropylidenediphenylene, phthalidylidene diphenylene, e.g., (derived from phenolphthalein) and inertly substituted derivatives thereof wherein an inert substituent is halo, hydrocarbyl such as alkyl or aryl, halohydrocarbyl and the like. Of the foregoing aromatic hydrocarbylenes, phenylene is most preferred.

The carbonates are prepared by reacting a hydroxycarboxylic acid, such as one corresponding to the formula

wherein R is as defined hereinbefore, with phosgene or similar carbonate forming agent under basic conditions conventionally employed to form carbonates, e.g., as described in U.S. Pat. No. 3,792,075. The resulting diacid carbonate is converted to the corresponding diacid halide by reacting the diacid with thionyl chloride in benzene, e.g., as described in U.S. Pat. No. 3,898,263. Exemplary hydroxycarboxylic acids include m- and p-hydroxybenzoic acids and their halogenated derivatives such as 3-hydroxy-5-chlorobenzoic acid and 3-chloro-4-hydroxybenzoic acid; and other aromatic hydroxycarboxylic acids such as 4-(4-hydroxyphenyl)benzoic acid, 4-[(4-hydroxyphenyl)isopropylidenyl] benzoic acid, 4-(4-hydroxyphenoxy)benzoic acid and the like.

In preparing the alternating copolymer, the dihydric phenol and the bis(ar-haloformylaryl) carbonate (hereinafter called carbonate) are diluted with solvents to provide diluted reactants which are immiscible. While the concentrations of the reactants in the solvents are not particularly critical, the concentration of dihydric phenol is preferably from about 1 to about 20 weight percent based on weight of the solution of dihydric phenol, and the concentration of the carbonate is preferably from about 1 to about 20 weight percent based on the solution of the carbonate. Similarly the ratio of reactants is not critical. Preferably, however, the reactants are employed in stoichiometric amounts to avoid waste of reactants. A diluent is a suitable solvent for the dihydric phenol if it forms at least a 1 weight percent solution of the dihydric phenol, is a nonsolvent for the carbonate, and is immiscible in the solvent for the carbonate. Similarly, a suitable solvent for the carbonate forms at least a 1 weight percent solution of the carbonate, is a nonsolvent for the dihydric phenol and is immiscible in the solvent for the dihydric phenol.

Of the known solvents for the dihydric phenol, water is the most advantageously employed in the preparation of the copolycarbonate. Exemplary suitable carbonate solvents include halogenated hyrocarbons such as methylene chloride and chloroform, aromatic hydrocarbons such as toluene, benzene and xylene, and the like. Of the carbonate solvents, chloroform and methylene chloride are preferred.

The diluted reactants are combined with the aid of stirring and a surfactant to form the desired two-phase reaction medium. Surfactants suitably employed are those which promote emulsification of the diluted reactants to form the desired two-phase reaction medium. Accordingly, such surfactants may be anionic, cationic, nonionic including amphoteric. Examples of suitable surfactants are set forth in McCutcheon's *Detergents and Emulsifiers Annual*, John W. McCutcheon, Inc., Morristown, N.J. (1975). Of these surfactants, the organic sulfonates and sulfates having the general formulas R—SO$_3$M and R—OSO$_3$M wherein R represents a hydrocarbyl radical such as alkyl, aryl or alkaryl having from 9 to 23 carbons and M is alkali metal or ammonium are preferred, with sodium lauryl sulfate and sodium dodecyl benzene sulfonate being examples thereof. The amount of surfactant suitably employed is an amount sufficient to emulsify the diluted reactants so that the reactants remain dispersed during the reaction with the aid of stirring normally employed in carrying out such reactions. Preferably such amount is from about 0.1 to about 10, most preferably from about 1 to about 10, weight percent of surfactant based on the weight of water.

Reaction proceeds, advantageously in the presence of a quaternary salt accelerator, and in the presence of strong base.

The quaternary salt usefully employed as an accelerator in the aforementioned reaction is one represented by the formula:

wherein M is a pentavalent ion derived from an element of Group 5a of Mendeleev's Periodic Table of Elements (particularly N, P, and As), A is an organic portion of the salt molecule bonded to M by four covalent linkages and X is an anion which will dissociate from the cation (AM)$^+$ in an aqueous environment. It is understood that dibasic quaternary salts having two of the pentavalent Group 5a ions substituted in the manner described are included as well as polybasic salts which may be polymeric in character with the described group being repeated a number of times.

Preferred quaternary salts have the formula:

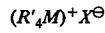

which may be monobasic, dibasic or polybasic as mentioned hereinbefore wherein M is N or P and X is as defined as hereinbefore and each R' is individually monovalent hydrocarbon radicals or inertly substituted hydrocarbon radicals wherein the inert substituents are as defined hereinbefore, preferably alkyl, alkenyl, aryl, alkaryl, ar-alkyl, and cycloalkyl radicals. Although less preferred than the aforementioned hydrocarbon radicals, R' is also suitably hydroxyalkyl. It is especially preferred that the total number of carbon atoms in the sum of R' taken 4 times should be at least 13 and is preferably from about 16 to about 20. Moreover, it is recognized that two of the R' groups may be taken collectively together with the quaternized atom (M) to form a 5- or 6-membered heterocyclic ring group which may also contain one atom of nitrogen, sulfur or oxygen within the ring. For example, the two R' groups may collectively be alkylene such as —(CH$_2$)$_4$— or —(CH$_2$)$_5$— or alkyleneimino alkylene such as —(CH$_2$)$_2$NH(CH$_2$)$_2$— and others such as —(CH$_2$)$_2$O(CH$_2$)$_2$, —(CH$_2$)$_2$SCH$_2$— and —(CH$_2$)$_2$OCH$_2$. Preferably, R' is a hydrocarbyl group of 1 to 12 carbon atoms, preferably 1 to 7 carbon atoms, M is nitrogen and X is a neutralizing monovalent anion such as chloride, bromide, fluoride, iodide, tosylate, acetate, methylsulfate, bisulfate and the like with chloride and bromide being preferred.

The following are illustrative of preferred quaternary ammonium catalysts: tetraalkylammonium salts such as tetramethyl-, tetraethyl-, tetra(n-butyl)-, tetra(n-pentyl)-, tetrahexyl-, methyltriethyl-, trioctylmethylcetyltrimethyl- and tridecylmethylammonium chlorides, bromides, iodides, bisulfates, tosylates and the like; aralkyltrialkylammonium salts such as tetrabenzylammonium chloride, benzyltrimethyl-, benzyltriethyl-, benzyltributyl- and phenethyltrimethylammonium chlorides, bromides and the like; arylammonium salts such as triphenylmethylammonium fluoride, chloride or bromide, n,n,n-trimethylanilinium chloride, n,n,n-triethylanilinium bromide and others listed in U.S. Pat. Nos. 3,972,887 and 3,992,432 which are hereby incorporated by reference. Especially preferred catalysts are tetrabutylammonium halides, benzyltrimethylammonium halides, benzyltriethylammonium halides and the like, with tetrabutylammonium chloride being most preferred.

The concentration of the quaternary salt is suitable if it accelerates the rate of the reaction forming the alternating copolymer. Preferably such concentration is from about 0.01 to about 0.1, most preferably from about 0.02 to about 0.05 weight percent of the salt based on the weight of total reaction mixture including solvents.

It is generally desirable to carry out the reaction in the presence of a strong inorganic base such as an alkali metal hydroxide or an alkaline earth metal hydroxide, preferably an alkali metal hydroxide such as sodium hydroxide and potassium hydroxide, most preferably sodium hydroxide. The amount of base is suitably an amount sufficient to convert essentially all of the dihydric phenol to metal oxide form. Accordingly, the base is advantageously used in stoichiometric amounts.

The temperatures employed to effect the desired reaction are not particularly critical, so long as the quaternary salt is stable at such reaction temperature. It is observed, however, that a preferred rate of reaction is obtained at temperatures from about 5° to about 60° C with more preferred rates being obtained at temperatures from about 15° to about 50° C. Reaction pressure is similarly not critical and generally atmospheric or superatmospheric pressures are used as a matter of convenience. Under the foregoing conditions, reaction is generally complete within times from about 5 minutes to about 48 hours with most reactions being complete in times from about 0.25 to about 3 hours.

Agitation (e.g., stirring, swirling, etc.) of the reaction mixture is generally desirable to maintain emulsification of the reactants and effective heat transfer throughout the reaction medium. In order to achieve the most desirable high molecular weight alternating copolymers, the reaction mixture is subjected to high speed mixing, i.e., sufficient shear to form and maintain a dispersion of colloidal-size liquid globules.

Following completion of the reaction, the desired product is readily recovered from the reaction medium by conventional techniques as exemplified in the following examples.

The alternating copolymers of this invention are advantageously represented by the formula:

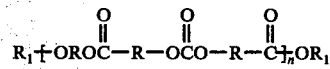

wherein each $R_1$ is independently a terminating group common to polyester or polycarbonates, R is as defined hereinbefore and n is a whole number from about 5 to about 300.

Preferred alternating copolymers are those represented by the formula:

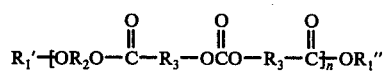

wherein $R_1'$ is hydrogen, hydrocarbyl, hydrocarbylcarbonyl(acyl), or inertly substituted hydrocarbyl or hydrocarbylcarbonyl, e.g., alkyl, aryl, alkaryl, aralkyl, cycloalkyl, alkoxyalkyl, alkylcarbonyl or arylcarbonyl; $R_1''$ is hydrogen, a hydrocarbyl, e.g., alkyl, aryl, alkaryl, aralkyl, cycloalkyl, or inertly substituted hydrocarbyl, e.g., alkoxyalkyl, alkoxyaryl, each $R_2$ is independently alkylidenediphenylene or inertly substituted alkylidenediphenylene; each $R_3$ is independently phenylene or inertly substituted phenylene; and n is a whole number from about 5 to about 300, preferably from about 10 to about 200 and most preferably from about 30 to about 100. For purposes of this invention, hydrocarbyl is a monovalent hydrocarbon radical. In the most preferred alternating copolymers, $R_2$ is

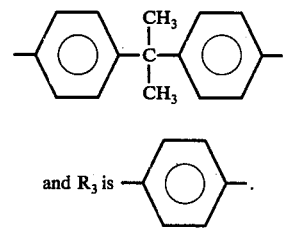

While the molecular weight of the alternating copolymers of this invention is not particularly critical, those having weight average molecular weight (Mw) greater than 20,000 are of more significance. It is found that those copolymers of relatively high molecular weight, e.g., those having a weight average molecular weight (Mw) of at least about 25,000 up to and including those having an Mw of about 60,000, are found to exhibit the properties and physical characteristics most desirable of molding resins. Most preferred for this purpose are those copolymers having an Mw in the range from about 25,000 to about 40,000.

The following examples are given to illustrate the invention and should not be construed as limiting its scope. Unless otherwise indicated, all parts and percentages are by weight.

EXAMPLE 1

Bis(4-chloroformylphenyl)carbonate is prepared by charging a 2 liter flask with 138 g. (1 mole) of p-hydroxybenzoic acid and a solution of 86.8 g. (2.1 mole) of sodium hydroxide in 690 ml. of H₂O. The mixture is stirred to form a clear yellow solution which is cooled to 10°–15° C with an ice/water bath. Phosgene gas is rapidly bubbled into the stirred solution for 2¼ hours to form a very thick, white suspension having a pH not more than 7. The suspension is warmed to room temperature and is purged with nitrogen gas until no phosgene is detected in the exit gases. To the stirred suspension is added about 500 ml. of 10% HCl to form a very thick, pasty white mixture. This mixture is filtered in a coarse fritted glass Buchner funnel. The resulting chalky white solid is washed several times with H₂O and then with acetone and dried in a vacuum oven overnight to yield 152.97 g. of a fine, chalky white powder, which did not melt below 360° C. Analysis of this product indicated it to be bis(4-carboxyphenyl) carbonate.

A mixture of 34.6 g. (0.115 mole) of bis(4-carboxyphenyl) carbonate, 42.5 g. (0.36 mole) of thionyl chloride, 70 ml. of benzene and 8 drops of pyridine are stirred and refluxed overnight under a CaCl₂ drying tube and condenser. The resulting yellow solution containing sodium chloride solid is filtered hot and cooled to room temperature. Removal of benzene and excess thionyl chloride on a rotating evaporator yields a light yellow solid which is recrystallized twice from benzene/hexane to give long white needles (80%), mp 104°–105° C. Analysis of this recrystallized product indicates it to be bis(4-chloroformylphenyl) carbonate.

Fifty-one g. (0.15 mole) of bis(4-chloroformylphenyl) carbonate is dissolved in 0.5 liter of chloroform and added dropwise over 5 minutes to a rapidly stirred mixture of 34 g. (0.15 mole) of bisphenol-A, 24 parts (0.3 mole) of 50 percent aqueous sodium hydroxide, 15 ml. of 30 percent active sodium lauryl sulfate and 0.79 parts of tetrabutylammonium chloride in 1 liter of water at 20°–25° C. The resulting reaction mixture is stirred at 2500 rpm in a 2 liter resin pot for 3–4 hours at room temperature. The stirrer consists of a shaft having two impellers mounted thereon, one near the bottom of the resin pot and the other about midway in the resin pot which is over half full with the reaction mixture. Thereafter the reaction product is poured into 6–7 liters of actone. The coagulated solid is washed and blended thoroughly with water several times. The solid is dried in vacuo to yield 63 parts of polycarbonate-polyester (85 percent of theory) having an inherent viscosity of about 1.35 (measured in sym-tetrachloroethane, at 25° C, 0.5 g/100 ml). Analysis of the polymer by infrared (IR) and nuclear magnetic resonance (NMR) indicates that it is an alternating copolymer having repeating units represented by the formula:

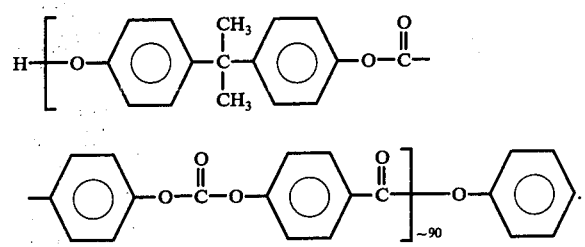

Testing of the polymer for physical properties indicates the following:
  Tensile Impact (ASTM D-1822) — 230 ft-lb/in²
  Tensile Strength (ASTM D-638) — 9400 psi
  Vicat Softening (ASTM D-1525) — 210° C
  Limited Oxygen Index (ASTM D-2863) — 28% O₂
  Notched Izod Impact (ASTM D-256) — 4 ft-lbs/in notch

EXAMPLE 2

Bis(4-chloroformylphenyl)carbonate (16.4 parts) is dissolved in 152 ml of chloroform and added dropwise over 3 minutes to a rapidly stirred mixture of 14.96 parts of phenolphthalein, 7.5 parts of 50 percent aqueous sodium hydroxide, 4.7 ml of 30 percent aqueous sodium lauryl sulfate, and 0.23 parts of tetrabutylammonium chloride in 308 ml of water at 20°–25° C. The mixture is rapidly stirred at 20°–25° C for 3 hours or until the mixture is colorless. The mixture is then poured into 2 l of acetone. The coagulated solid is washed with acetone and then dried in vacuo to yield 23.5 parts of polycarbonate-polyester (86 percent of theory) having an inherent viscosity of 0.85 (measured in methylene chloride at 20°–25° C). The polymer is observed to soften at 290°–295° C. Analysis of the polymer indicates that it is an alternating copolymer with repeating units represented by the formula:

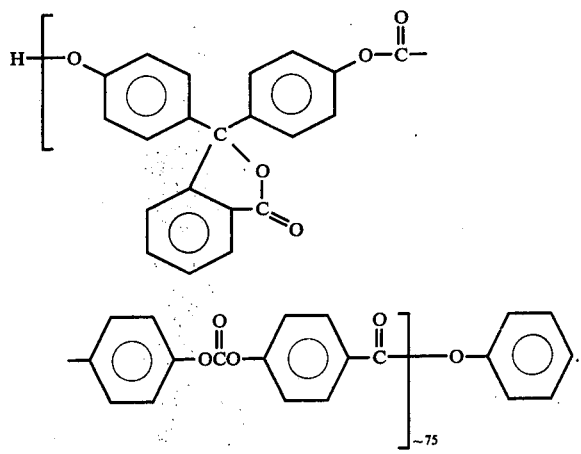

EXAMPLE 3

Following the general operating procedure of Example 1, several different polymerization runs are carried out using approximately stoichiometric amounts of the reactants wherein the solvent for the bisphenol-A is water and the solvent for the bis(4-chloroformalphenyl)carbonate is ethylene dichloride in Run No. 1 of Table I and chloroform in the remaining runs. In these runs, reaction conditions such as agitation, accelerator, surfactant and reaction time are varied as indicated in Table I. In Run No. 11, the polymer is capped with ethanol and in Run No. 12, the polymer is capped with phenol. In all other runs, no capping agent is employed. The yields and inherent viscosities (η inh) for the recovered alternating copolymers are determined and reported in Table I.

TABLE I

| Run No. | Agitation Apparatus | Agitation Rate, rpm | Surfactant | Accelerator Type | Accelerator Amount(1), % | Reaction Time | Yield(2) % | η inh(3) |
|---|---|---|---|---|---|---|---|---|
| 1 | Blender(a) | ~2,000 | SLS(d) | None | — | 5 min. | 58 | 1.04 |
| 2 | Blender(a) | " | SLS(d) | None | — | 5 min. | 60 | 1.06 |
| 3 | Blender(a) | " | SLS(d) | None | — | 20 min. | 65 | 1.42 |
| 4 | Blender(a) | " | SLS(d) | None | — | 40 min. | 70 | 1.12 |
| 5 | Blender(a) | " | SLS(d) | None | — | 60 min. | 76 | 1.23 |
| 6 | Blender(a) | " | SLS(d) | TBAC(e) | 0.008 | 40 min. | 79 | 1.63 |
| 7 | Blender(b) | 15,000 | SLS(d) | None | — | 9 min. | 72 | 1.59 |
| 8 | Blender(b) | " | None | TBAC(e) | 0.045 | 40 min. | 68 | 0.54 |
| 9 | Pot Stirrer(c) | 2,400 | SLS(d) | TBAC(e) | " | 200 min. | 76 | 1.22 |
| 10 | Pot Stirrer(c) | " | None | TBAC(e) | 0.09 | 60 min. | 87 | 0.33 |
| 11 | Pot stirrer(c) | " | SLS(d) | TBAC(e) | 0.045 | 195 min. | 85 | 1.34 |
| 12 | Pot Stirrer(c) | " | SLS(d) | TBAC(e) | " | 195 min. | 75 | 1.33 |
| 13 | Pot Stirrer(c) | " | None | BTEAC(f) | 0.18 | 250 min. | 44 | 0.17 |
| 14 | Pot Stirrer(c) | " | SLS(d) | BTEAC(f) | 0.045 | 250 min. | 90 | 0.56 |

(a)1-Qt. Waring Blendor having a 30 psi air motor
(b)1-Gal. Waring Blendor having a stirrer driven by an electric motor
(c)2-l resin pot having a double impeller stirrer as described hereinbefore
(d)Sodium lauryl sulfate (30 percent active in water) added to aqueous phase to provide a 6 percent concentration of SLS (100 percent) in the aqueous phase
(e)TBAC - tetrabutyl ammonium choride
(f)BTEAC - benzyltriethyl ammonium chloride
(1)Percentages based on total reaction mixture including solvents
(2)Yield percentage based on weight of isolated polymer
(3)Inherent viscosity determined at 0.5 percent of the polymer in sym-tetrachloroethane at 25° C.

As evidenced by the inherent viscosities of Table I (e.g., Run Nos. 7-9) the use of surfactant facilitates the formation of higher molecular weight polymers. The presence of an accelerator (Run Nos. 6 and 8-14) decreases the amount of reaction time required to produce a given yield of a polymer having a given molecular weight.

EXAMPLE 4

Following the procedure of Example 1, an alternating copolymer (Sample No. 1) is prepared and tested for physical strength, heat resistance and molecular weight. The results are reported in Table II.

For purposes of comparison, a random copolymer having the same amount of carbonate and ester moieties is prepared using bisphenol-A, p-hydroxybenzoic acid and phosgene according to procedure described in U.S. Pat. No. 3,169,121 (particularly Examples 22 and 23). This polymer (Sample No. A) is similarly tested for physical properties and the results are reported in Table II.

TABLE II

| Sample No. | 1 | A* |
|---|---|---|
| Vicat Softening(1), ° C | 210 | 172 |
| Tg(2), ° C | 202 | 164 |
| Tensile Impact(3), psi | 230 | 184 |
| Inherent Viscosity(4) | 1.07 | 0.83 |
| Mw(5) | ~45,000 | ~45,000 |

*Not an example of the invention
(1)ASTM D-1525
(2)Second order transition temperature
(3)ASTM D-1822
(4)Inherent Viscosity sym-tetrachloroethane at 25° C and 0.5 g/100 ml
(5)Weight average molecular weight determined from gel permeation chromatograms based on polystyrene standards.

As evidenced by the foregoing data, the alternating copolymer of this invention exhibits surprisingly higher heat resistance and better strength than does the corresponding conventional random copolymer.

What is claimed is:

1. A normally solid alternating copolyestercarbonate consisting essentially of repeating units of the formula:

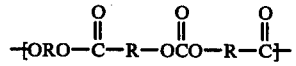

wherein each R is independently aromatic hydrocarbylene or inertly substituted aromatic hydrocarbylene.

2. The copolyestercarbonate of claim 1 represented by the formula:

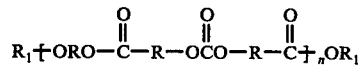

wherein each R is independently aromatic hydrocarbylene or inertly substituted aromatic hydrocarbylene and each $R_1$ is independently a terminating group common to polyesters or polycarbonates and $n$ is a whole number from about 5 to about 300.

3. The copolyestercarbonate of claim 2 represented by the formula:

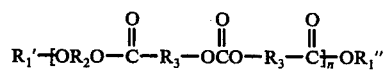

wherein $R_1'$ is hydrogen, alkyl, aryl, alkaryl, aralkyl, cycloalkyl, alkoxyalkyl, alkylcarbonyl or arylcarbonyl; $R_1''$ is hydrogen, alkyl, aryl, alkaryl, aralkyl, cycloalkyl, alkoxyalkyl or alkoxyaryl; each $R_2$ is independently alkylidenediphenylene or inertly substituted alkylidenediphenylene; each $R_3$ is independently phenylene or inertly substituted phenylene and $n$ is from about 10 to about 200.

4. The copolyestercarbonate of claim 3 wherein each $R_2$ is

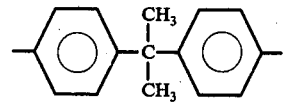

and each $R_3$ is

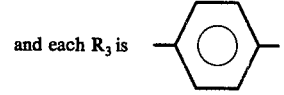

and $n$ is from about 30 to about 100.

5. A method for preparing the copolyestercarbonate of claim 1 which comprises reacting a dihydric phenol with a bis(ar-haloformylaryl)carbonate in a two-phase reaction medium wherein one phase containing one reactant is dispersed into the other phase containing the other reactant, said reaction being carried out in the presence of a quaternary salt accelerator in an amount sufficient to accelerate the rate of the reaction, said quaternary salt accelerator represented by the formula:

$$(AM)^\oplus X^\ominus$$

wherein M is a pentavalent ion derived from an element of Group 5a of Mendeleev's Periodic Table of Elements, A is an organic portion of the salt bonded to M by four covalent linkages and X is an anion which will dissociate from $AM^-$ in an aqueous environment.

6. The method of claim 5 wherein M is nitrogen.

7. The method of claim 6 wherein the quaternary salt accelerator is represented by the formula:

$$(R'_4M)^\oplus X^\ominus$$

wherein M is nitrogen, X is a neutralizing monovalent anion and each R' is individually a monovalent hydrocarbon radical or an inertly substituted hydrocarbon radical.

8. The method of claim 7 wherein R' is alkyl wherein the sum of carbon atoms in the four R' groups is at least 13 and X is chloride or bromide, and the concentration of the salt is from about 0.01 to about 0.1 weight percent based on total reaction mixture.

9. The method of claim 5 wherein the reaction is carried out in the presence of an amount of a strong inorganic base sufficient to convert essentially all of the dihydric phenol to metal oxide form.

10. The method of claim 9 wherein the strong inorganic base is an alkali metal hydroxide or an alkaline earth metal hydroxide and the amount of base is stoichiometric to amount of dihydric phenol.

* * * * *